United States Patent [19]

Ueda

[11] 4,399,106
[45] Aug. 16, 1983

[54] REACTOR FOR PREPARING URANIUM TRIOXIDE

[76] Inventor: Kimio Ueda, Tokyo, Japan
[21] Appl. No.: 295,999
[22] Filed: Aug. 25, 1981
[30] Foreign Application Priority Data Sep. 2, 1980 [JP] Japan .............................. 55-120693

[51] Int. Cl.³ .......................................... C01G 43/01
[52] U.S. Cl. .................................. 422/140; 422/142; 422/146
[58] Field of Search .............. 422/140, 141, 142, 144, 422/146

[56] References Cited

U.S. PATENT DOCUMENTS

| | | | |
|---|---|---|---|
| 2,416,730 | 3/1947 | Arveson | 422/141 X |
| 2,734,020 | 2/1956 | Brown | 422/144 X |
| 3,869,543 | 3/1975 | Schutte et al. | 422/141 |
| 3,898,043 | 8/1975 | Schutte et al. | 422/140 |

Primary Examiner—Arthur D. Kellogg

[57] ABSTRACT

Nuclear fuels, such as uranium trioxide, are prepared by thermal decomposition of a nitrate in a fluidized bed reactor. The fluidized bed reactor for preparing uranium trioxide from uranyl nitrate by thermal decomposition has (a) a rectangularly shaped bed which satisfies the critical safety shape of $^{235}U$, (b) plural holes to supply an aqueous solution of uranyl nitrate into the reactor, (c) at least two reaction rooms divided by barriages, the bottoms of the barriers being capable of being lifted to control their distance from the floor and a mechanism by which uranium trioxide powder is taken out mainly by being overflowed from the top of the barriers through the reaction rooms, (d) heating means inside and outside of the fluidized-bed, and (e) a head structure which is upwardly V-shaped. Continuous operation can be attained with ease, and uranium trioxide can be made efficiently.

17 Claims, 2 Drawing Figures

REACTOR FOR PREPARING URANIUM TRIOXIDE

BACKGROUND OF THE INVENTION

1. Field of the Invention

The present invention relates to a reactor for preparing a nuclear fuel and particularly to an improved fluidized-bed reactor for preparing uranium trioxide easily in a continuous and efficient manner.

2. Description of the Prior Art

Usually in a nuclear reactor using enriched uranium as a nuclear fuel, uranium is separated from used nuclear fuel after removing fission products and plutonium and is used again for the nuclear fuel. In this case, uranium is separated usually as uranyl nitrate, so a process for preparing uranium trioxide from uranyl nitrate is necessary.

For preparing uranium trioxide, usually a precipitation method or a direct denitration method is used. The present invention relates to the latter method.

The precipitation method comprises adding ammonia to an aqueous solution of uranyl nitrate, precipitating ammonium diuranate, and baking the precipitate to give a powder of uranium trioxide. A benefit of this method is the ease of elimination of impurities in the residual. However, the method has many defects such as difficulty in establishing a precipitation condition, and it is unsafe. Also, the precipitation method generates a large amount of effluent comprising ammonium nitrate. Many difficulties are encounted treating this effluent.

On the other hand, a direct denitration method comprises directly heating an aqueous solution of uranyl nitrate, concentrating it by evaporation of water, and decomposing it to form uranium trioxide powder. The main reactions are believed to be:

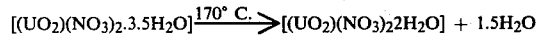

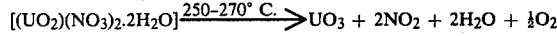

The direct denitration method is simpler to handle and uses a simpler reactor compared with the precipitation method. The reason for this is the direct denitration method is a heat decomposition reaction, and small amounts of effluent are produced because additives are not used. Although impurities would remain in the powder, they can be eliminated by purifying uranyl nitrate as a raw material.

Further, in the direct denitration method, a fluidized-bed reactor has often been used because of simplicity of the reactor, little amount of effluent, safety on account of little local heating and cooling, uniform quality of uranium trioxide powder, stability of the process due to good mixing, and the like.

However, long-running continuous operation of a fluidized bed reactor has been difficult. Cakes generate in holes for the supply of the aqueous solution of uranyl nitrate. Big particles caused by caking also generate to prevent good fluidity. Further, adopting proper structure to a fluidized-bed and stable operation is difficult because of the limitation of critical safety shape. For the sake of such defects, the efficiency of preparing uranium trioxide is inadequate.

As the result of many experiments, the present inventor developed a new improved fluidized-bed reactor having a rectangular shape to make long and safe running of a reactor possible in preparing uranium trioxide, to give high efficiency and to improve operation.

SUMMARY OF THE INVENTION

The present invention relates to a improved fluidized-bed reactor for preparing uranium trioxide. The reactor can be operated easily and uranium trioxide can be prepared efficiently.

An aqueous solution of uranyl nitrate is fed into the fluidized-bed reactor, heated, and decomposed. Uranium trioxide powder is prepared by a denitration reaction and is removed from said reactor. The fluidized-bed reactor has (a) a rectangularly (including squarely) shaped bed which satisfies the critical safety shape of $^{235}U$, (b) plural holes to supply an aqueous solution of uranyl nitrate into said fluidized-bed, (c) at least two reaction rooms divided by a moveable barrier or barriers, the bottoms of which can be moved to control their distance from the floor of the fluidized-bed, and a mechanism with which uranium trioxide powder is removed by mainly being overflowed from the top of said barrier through at least two reaction rooms, (d) a heating means inside and outside of said fluidized-bed, and (e) a head structure which is upwardly V-shaped.

The reactor of the present invention is a superior, improved fluidized-bed reactor for preparing uranium trioxide from an aqueous solution of uranyl nitrate which has good fluidity, substantial uniformity of heat, high safety, good continuous operation, high throughputs, and high efficiency. The reactor's interior can be cleaned easily. Manufacture of the reactor is comparatively easy.

DETAILED DESCRIPTION OF THE INVENTION

Figure 1:
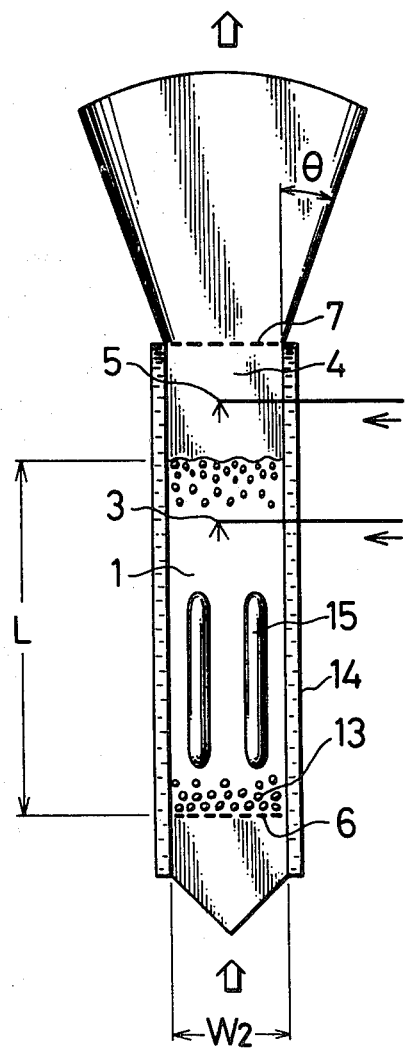
FIG. 1 is a side view explaining important parts of an example of the present invention.
Figure 2:
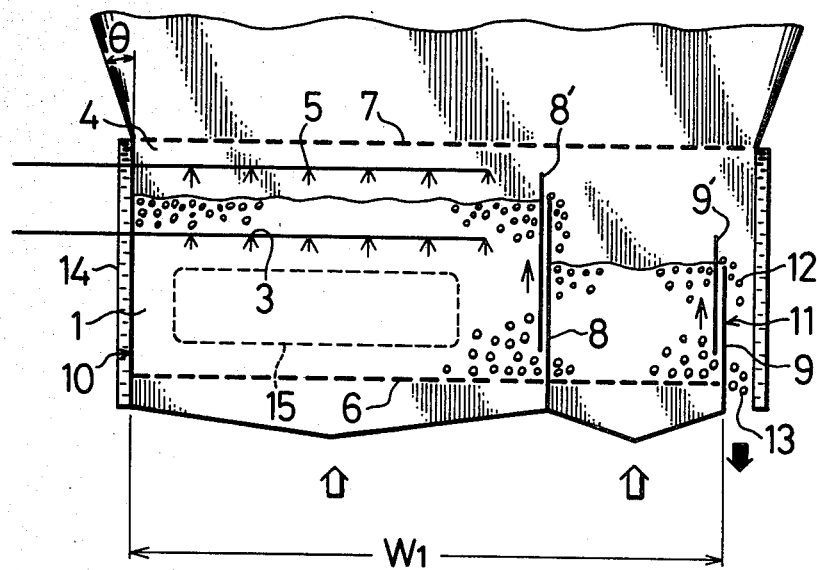
FIG. 2 is an elevational view in FIG. 1.

An aqueous solution of uranyl nitrate for concentration and denitration, is fed to a fluidized-bed from plural holes 3 equipped in the thickened area (fluidized-bed) 1 of the fluidized-bed reactor and/or plural holes 5 equipped in the diluted area (upper area of fluidized-bed) 4 of said reactor, as shown in FIGS. 1 and 2. The plural holes for supplying the aqueous solution can be spray nozzles. The aqueous solution is fed at a concentration of 1200 gU/l, with hot air of about 150° C., after concentration by evaporation. By supplying the solution from many holes, more stable fluidity conditions can be obtained, because local cooling caused by extensive absorption of heat can be avoided. Also, generation of caking near supply holes and generation of big particles thereby can be prevented. Further, by equipping the reactor with supply holes in both the thickened area and diluted area, it becomes easy to control the fluidity condition. Also, the amount of powder which sticks to the upper wall of the reactor decreases to give good heat transfer. Pressurized hot air of about 370° C. (white arrow in FIGS. 1 and 2) is blown from the bottom of the reactor through dispersion plate 6 made of sintered metal, fluidized-bed 1, and filter 7 of sintered and is discharged from the upper area of the reactor. In the meantime, hot air heats the aqueous solution of uranyl nitrate and thermally decomposes uranyl nitrate at about 150°–300° C. to give uranium trioxide.

As shown in FIG. 2, fluidized bed 1 is divided into more than or equal to two reaction rooms 10, 11, etc. by barriers 8, 9, etc. Fluidized particles 12 is taken off (black arrow) mainly by overflowing the upper ends of the barriers through at least two reaction rooms. The barriers are positioned to obtain optimum fluidity and to avoid troubles of caking, etc. Thus, to achieve optimum fluidity, it is necessary to maintain an optimum height of the fluidized-bed during operation. The optimum height of the fluidized-bed is changed by the width of the fluidized-bed and the sizes of the particles. It is therefore necessary to position the barriers to strictly maintain the optimum height of the fluidized-bed. The lower ends of the barriers can be lifted and the distance between the lower ends of barriers and the floor of the reaction rooms (or the reactor) can be controlled. The barriers themselves can be moved up and down. The barriers can also be made by equipping assistant plates at the lower end of main barriers. The assistant plate can be moved up and down on behalf of the main barriers. In this embodiment, the upper ends of the barriers are of constant height. By passing through at least two reaction rooms completion of the reaction is assured. Further, removing uranium trioxide by overflowing clogging of the outlet can be prevented. Also, because the lower ends of the barriers can be lifted and the distance between the lower ends of the barriers and the floor of the reaction rooms can be controlled, big particles 13 which are inevitably generated in a fluidized-bed, can be removed under the barriers by moving them upwardly (8' and 9' indicate the states where barriers 8 and 9 are lifted upwardly, respectively). As a result, the accumulation of particles can also be prevented. The reaction rooms can easily be cleaned, as needed, by the above-described mechanism of barriers. The thermal decomposition reaction in the fluidized-bed needs an adequate supply and uniform distribution of heat. For this reason, hot air is introduced from the bottom of the reactor. In addition, as shown in FIGS. 1 and 2, a jacket 14 is equipped outside of the reactor which is supplied with, for example, a heating medium or hot air.

It is preferable to use a neutron absorber as a heat insulator of the heater inside or outside, because the shape of the reactor can be designed in the relieved shape of the critical safety shape (that is, the tolerance of the critical safety shape and safety of the operation can be improved). The neutron absorber can be made from a boron compound especially from fibers of a boron compoud, including condensed $B^{10}$.

In addition, at least one assistant heater 15 is equipped inside the fluidized-bed. The kind and shape of the assistant heater 15 is not critical. However, a shape which does not prevent fluidity, such as a stream-lined panel is preferable. The of assistant heater 15 has no effect on the critical safety shape of $^{235}U$ as described below. It provides an increase of safety and allows increased production. The critical safety shape of $^{235}U$ prescribes so called critical amounts of several nuclear fuels which are permitted to be stored in bulk by geometrical shape. It is necessary that the bulk of the radioactive substance do not undergo a chain reaction for the reactor to remain safe.

Generally speaking, many cylindrical reactors are used for fluidized-bed reactions. However if a cylindrical reactor is used in the reaction of the present reaction, the height of the fluidized-bed needed to attain stable fluidity cannot be used because of the critical safety shape limitation. Also, slugging is apt to occur.

On the other hand, the fluidized-bed of the reactor of the present invention is shaped to form a rectangular parallelepiped as shown in FIGS. 1 and 2 (including a cube). Accordingly, the fluidized-bed can be designed to have as large a volume as designed, in satisfaction of the critical safety shape, if the fluidized-bed has the width of a theoretically endless plane. For example, if a fluidized-bed (thickened area) having a length ($W_1$) of 1900–2100 mm, a width ($W_2$) of 150~300 mm and a height (L) of 300–600 mm is used, it conforms to the critical safety shape and it can maintain a stable fluidity condition. Also, slugging does not readily occur.

At its top, the reactor has a V-shaped structure which enlarges upwardly to maintain a proper air velocity. The angle ($\theta$) of the V-shaped portion is less than or equal to 25°, preferably 20° which prevents accumulation of powder. This makes it possible to run the reactor without means for preventing powder accumulation, such as scraper, and the like. Also, the reactor of the present invention can be used for synthesizing plutonium oxide from plutonium nitrate by denitration. Synthesizing plutonium oxide and uranium oxide from mixtures of plutonium nitrate and uranyl nitrate by denitration can also be achieved with the reactor of the present invention.

What is claimed is:

1. A fluidized-bed reactor for preparing a nuclear fuel by heat decomposing a nitrate comprising:
   (a) a parallelepiped-shaped fluidized-bed which satisfies the critical safety shape of $^{235}U$,
   (b) means for supplying an aqueous solution of the nitrate into the reactor, said supply means having a plurality of openings, and
   (c) at least one barrier for dividing the fluidized-bed into at least two reaction rooms, the bottom of said at least one barrier being moveable to control the distance from the floor of the reaction room to the bottom of the barrier for removal of particles generated in the fluidized-bed, the removal of nuclear fuel particles from the reactor being mainly by overflowing each of the barriers.

2. A fluidized-bed reactor as claimed in claim 1 which further comprises heating means outside of said fluidized-bed.

3. A fluidized-bed reactor as claimed in claim 2 which further comprises at least one heating means inside said fluidized-bed.

4. A fluidized-bed reactor as claimed in claim 3 wherein the outlet of the reactor has a head structure which is upwardly V-shaped.

5. A fluidized-bed reactor as claimed in claim 1 wherein said supply means supply the aqueous solution to only one reaction room.

6. A fluidized-bed reactor as claimed in claim 1 wherein each of the barriers can be moved up and down.

7. A fluidized-bed reactor as claimed in claim 1 wherein the upper end of said at least one barrier is of constant height.

8. A fluidized-bed reactor as claimed in claim 1 wherein each of said barriers comprises a main barrier and an assistant plate which moves up and down on behalf of the main barrier.

9. A fluidized-bed reactor as claimed in claim 1 wherein said fluidized bed is rectangular parallelepiped shaped.

10. A fluidized-bed reactor as claimed in claim 1 wherein said fluidized bed is square parallelepiped shaped.

11. A fluidized-bed reactor as claimed in claim 4 which has a dispersion plate for dispersing pressurized hot air into said fluidized bed, and a filter between the fluidized bed and said head structure.

12. A fluidized-bed reactor as claimed in claim 1 wherein said means for supplying the aqueous solution are provided in both the concentrated area and the diluted area of the fluidized bed reactor.

13. A fluidized-bed reactor as claimed in claim 1 or 12 wherein said plurality of openings are spray nozzles.

14. A fluidized-bed reactor as claimed in claim 4 wherein the angle of the V-shape is less than or equal to 25°.

15. A fluidized-bed reactor for preparing uranium trioxide by charging an aqueous solution of uranyl nitrate into the reactor, decomposing the nitrate by heating to form uranim trioxide powder with liberation of nitric acid, and removing the powder and nitric acid from the reactor, said fluidized-bed reactor comprising (a) a parallelepiped-shaped bed which satisfies the critical safety shape of $^{235}U$, (b) a plurality of holes for supplying said aqueous solution into the reactor, (c) at least two reaction rooms and a mechanism for removing uranium trioxide powder from the reactor by overflowing it through said at least two reaction rooms, (d) heating means inside and outside of said fluidized-bed, and (e) an outlet which enlarges outwardly.

16. A fluidized-bed reactor as claimed in claim 15 which has plural holes to supply the aqueous solution of uranium nitrate in both the concentrated area and diluted area of said fluidized-bed reactor.

17. A fluidized-bed reactor as claimed in claim 15 or 16 wherein said plurality of holes for supplying uranium nitrate are spray nozzles.

* * * * *

UNITED STATES PATENT OFFICE
CERTIFICATE OF CORRECTION

Patent No. 4,399,106          Dated August 16, 1983

Inventor(s) Kimio Ueda

It is certified that error appears in the above-identified patent and that said Letters Patent are hereby corrected as shown below:

On the front page, left column, the assignment data should be included to appear as follows:

[73] Assignee: Mitsui Petrochemical Industries, Ltd., Tokyo, Japan

Signed and Sealed this

Sixteenth Day of December, 1986

Attest:

DONALD J. QUIGG

Attesting Officer          Commissioner of Patents and Trademarks